2 Sheets—Sheet 1.

F. W. SPACKE.

CENTRIFUGAL HIGH SPEED GOVERNOR.

No. 11,466. Reissued Jan. 22, 1895.

Witnesses
U. M. Hood
M. V. Hood.

Inventor:
Fred. W. Spacke.

By Attorney
H. P. Hood.

2 Sheets—Sheet 2.

F. W. SPACKE.

CENTRIFUGAL HIGH SPEED GOVERNOR.

No. 11,466. Reissued Jan. 22, 1895.

Witnesses
V. M. Hood
M. V. Hood

Inventor.
Fred. W. Spacke.

By Attorney
H. P. Hood.

UNITED STATES PATENT OFFICE.

FRED W. SPACKE, OF INDIANAPOLIS, INDIANA, ASSIGNOR TO THE SINKER-DAVIS COMPANY, OF SAME PLACE.

CENTRIFUGAL HIGH-SPEED GOVERNOR.

SPECIFICATION forming part of Reissued Letters Patent No. 11,466, dated January 22, 1895.

Original No. 521,483, dated June 19, 1894. Application for reissue filed December 14, 1894. Serial No. 531,354.

*To all whom it may concern:*

Be it known that I, FRED. W. SPACKE, of Indianapolis, in the county of Marion, State of Indiana, have invented certain new and useful Improvements in Centrifugal High-Speed Governors; and I do hereby declare the following to be a full, clear, and exact description of the invention, such as will enable others skilled in the art to which it appertains to make and use the same.

My invention relates to certain new and novel improvements in governors for steam engines, and the purpose is to provide means whereby prompt and absolute action of the operative parts can be obtained to control the differences in speed; and whereby the steam may be shut off at once from the engine when the driving-belt connecting the governor with the engine becomes disengaged from the pulleys on which it is mounted.

The accompanying drawings illustrate my invention.

Figure 1:
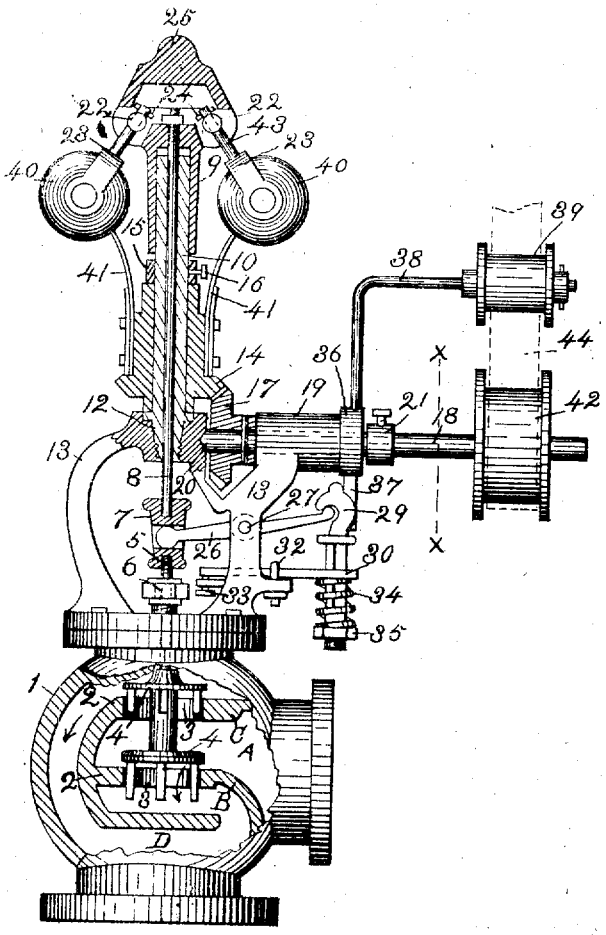
Figure 2:
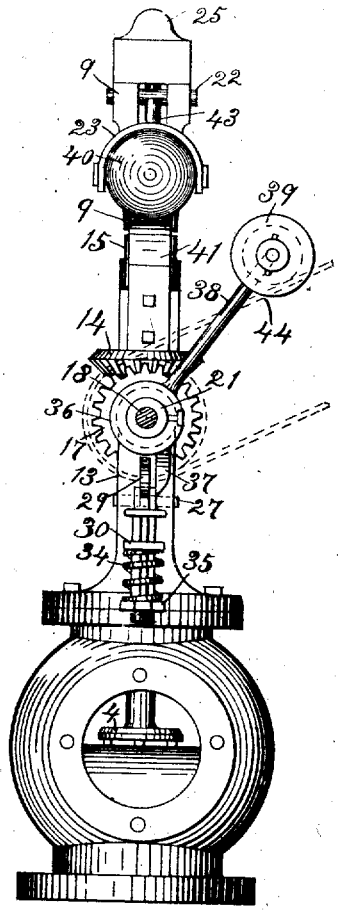
Figure 3:
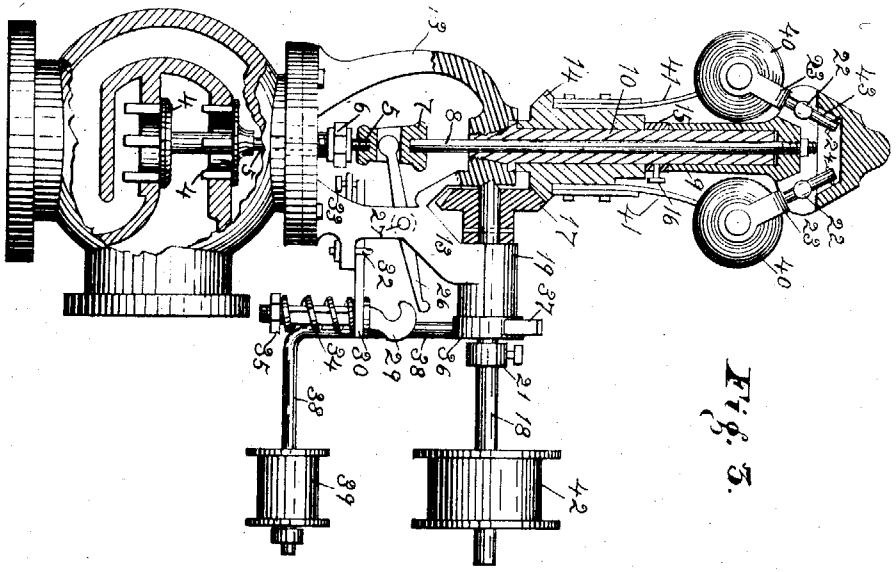

Figure 1 in the drawings represents a front elevation of my governor, partly in vertical section, the parts being in the positions assumed when the governor is running at a high speed. Fig. 2 represents a side elevation of the same, the driving shaft being shown in section at the line $x$—$x$, Fig. 1, and the driving-pulley and the belt which connects it to the engine, being indicated in dotted lines. Fig. 3 represents a front elevation, partly in section, similar to that shown in Fig. 1, the parts being in the positions assumed when the driving-belt has broken or has become otherwise disengaged from the driving-pulley.

In Fig. 1, 1, indicates the valve-body provided with steam partitions and valve-seats, 2, 2, and steam-ports, 3, 3, permitting the passage of the steam, as indicated by the arrows on the drawing. A balanced double valve, 4, 4, is screwed, or otherwise secured to the valve-rod, 5, which passes through the top flange of the valve-body and the stuffing-box, 6, and is screwed into the valve-rod coupling, 7. A supporting frame, 13, is mounted upon the valve-body, and carries upon its upper end a fixed hollow spindle, 10, which is screwed at 12 into the center of the support 13. A rod, 8, passes through hollow spindle 10, its upper end being tightly screwed into the governor-head, 9, and its lower end fitting loosely in the valve-rod-coupling, 7, so as to revolve freely therein. A bevel pinion, 14, bearing at its under side on the support at 12, is loosely mounted on spindle 10 so as to revolve freely thereon. Pinion 14 is prevented from moving longitudinally upon spindle 10 by a collar, 15, slipped over the spindle, and held in position thereon by a set-screw 16. Secured to opposite sides of the hub of pinion 14 are a pair of leaf-springs, 41, each having secured to its upper end a ball, 40.

The governor-head 9 is mounted upon the upper end of spindle 10 so as to revolve freely and slide longitudinally thereon. Mounted in the upper part of the governor-head are a pair of short horizontal shafts, 22, journaled into the governor-head so as to turn therein. Shafts 22 are connected, respectively, with the balls 40 by means of arms 23, 23, each of which is forked at one end, and is pivoted at that end to the ball so as to swing in a vertical plane thereon, and is provided at its other end with a cylindrical portion, 43, which passes diametrically through the shaft 22 so as to slide therein.

Through the upper ends of arms 23, stay-pins, 24, are provided to limit the outward movement of the arms in the shafts 22.

A cap, 25, is fitted over the governor-head, 9, to prevent dust entering into the working parts of the governor-head.

Intermeshing with pinion 14 is a corresponding bevel pinion, 17, rigidly secured to a horizontal shaft, 18, which is journaled in the horizontal arm, 19 forming a part of support 13, and is held in proper position by means of center pivot, 20, and collar 21. Secured to shaft 18, is a driving-pulley, 42, (shown in dotted lines in Fig. 2.)

Pivoted to the frame 13, by means of bolt 27, is a lever, 26, one arm of which passes into an oblong opening in coupling 7, and the other arm is engaged at its end with a trip-hook 29. Hook 29 is mounted loosely so as to slide vertically in a lever, 30, extending outward from frame 13, and held in position thereon by a clip, 32, and set-screw 33. Hook 29 is held normally downward by means of a spiral spring, 34, the tension of which is adjusted by means of nut 35, the upper end of the spring pressing against lever 30, and its lower end resting on nut 35. Mounted on shaft 18, between the end of arm 19 and collar 21, which is secured to the shaft, is a collar 36, arranged to turn loosely on the shaft and carrying a bent arm, 38, and a trip-finger, 37. Arm 38 is rigidly attached at one end to the collar, and is provided on its other end with an idler-pulley, 39, which is arranged to rest upon the belt, 44, which drives the governor.

Particular attention is called to steam-chamber A, its purpose being to equally divide the pressure of the steam onto the double valve 4, and pass said steam equally through the openings of valve-seats, 2, 2, through partitions, C, and B, into outlet D, thus producing instant action on the valve.

The operation of my device is as follows: Coupling 7, rod 8, and the governor-head 9 are held upward by means of lever 26, hook 29, and spring 34, thus raising and holding the valve 4 normally wide open. Idler-pulley 39 rests upon and is supported by the driving-belt, 44 thus holding trip-finger 37 out of engagement with hook 29. Steam being admitted to the engine through chamber A, and the engine started, a rotary motion is imparted to pinion 14, and the parts carried thereby, by means of pinion 17, shaft 18, driving-pulley 42 and the driving-belt connecting said pulley with the corresponding pulley on the engine. The centrifugal force thus imparted to balls 40 operates through arms 23 bringing pins 24 into engagement with shafts 22, to draw the governor-head 9, rod 8, coupling 7, and the valve, downward, thus partially closing the valve, as illustrated in Fig. 1, the centrifugal force being resisted by springs 41 and the adjustable tension-spring 34. Should the belt connecting the governor with the engine break or become otherwise disengaged, pulley 39 and the arm on which it is mounted will drop, thus turning collar 36 on shaft 18, and bringing arm 37 into contact with hook 29 so as to push the hook to one side out of engagement with lever 26. The rotary movement of the balls being stopped, the balls are drawn inward and upward by springs 41, which would, if arms 23 were pivoted directly to the governor-head, tend to raise the head, but, the shanks of arms 23 being free to slide through shafts 22, and the lever 26 being disengaged from hook 29, the valve, coupling 7, rod 8, and the governor-head 9 are without vertical support and their whole weight becomes immediately available to close the valve instantly and without regard to the position of the governor-balls.

I claim as my invention—

1. In a centrifugal speed governor, the combination of the tubular spindle 10 erected on the support 13, the rod 8 passing through said tubular spindle and supported at the lower end in valve-coupling 7 so as to revolve therein, the governor-head 9 slipping over tubular spindle 10 and rigidly connected to the upper end of rod 8, horizontal shafts 22 mounted in the governor-head, bevel-pinion 14, springs 41 secured at their lower ends to said bevel-pinion and carrying on their upper ends balls 40, arms 23 pivoted at one end to said balls, and having at their opposite ends a sliding connection with shafts 22, lever 26 pivoted to the supporting frame and engaged at one end with coupling 7, and a suitable trip 29 engaging the opposite end of said lever, all arranged to co-operate substantially as set forth, whereby valve 4 is instantly closed when lever 26 is released from trip 29.

2. In a centrifugal speed governor, the combination of valve 4, valve-rod 5, and its coupling 7, rod 8 supported by said coupling and connected in a vertical alignment with said valve-rod, the lever 26, pivoted between its ends and having one end engaging the coupling 7 and the opposite end engaging the trip-hook 29, the supporting lever 30, its fulcrum 32 and adjusting screw 33, one end of lever 30 having an opening to receive the shank of hook 29, the spring 34, and the adjusting nut 35, all arranged to co-operate substantially as described and for the purpose set forth.

3. In a centrifugal speed governor, the combination of the following elements: namely, the valve-chamber, the supporting frame erected thereon, the tubular spindle erected on said supporting frame, the valve, the coupling connected therewith, the trip mechanism arranged to hold the valve normally raised and open, intermediate connecting mechanism connecting said trip mechanism and the driving-belt of the governor, whereby the trip-mechanism is operated and the valve released by the removal of the driving-belt, the pair of governor-balls arranged to revolve about said hollow spindle, the governor-head mounted upon the upper end of the spindle and arranged to revolve and to slide longitudinally thereon, the rod connecting said governor-head with the valve-rod coupling, the pair of horizontal shafts journaled in said governor-head, and the pair of arms pivoted to the balls and having a sliding connection with said shafts, whereby the governor-head is permitted to slide downward on said spindle when said balls are moving inward and upward, substantially as and for the purpose set forth.

FRED W. SPACKE.

Witnesses:
H. P. HOOD,
U. M. HOOD.